United States Patent [19]
Saito

[11] Patent Number: 5,528,697
[45] Date of Patent: Jun. 18, 1996

[54] INTEGRATED VIBRATING AND SOUND PRODUCING DEVICE

[75] Inventor: Yoshikazu Saito, Tokyo, Japan

[73] Assignee: Namiki Precision Jewel Co., Ltd., Tokyo, Japan

[21] Appl. No.: 367,752

[22] Filed: May 6, 1994

Related U.S. Application Data

[63] Continuation of Ser. No. 881,031, May 11, 1992, abandoned.

[30] Foreign Application Priority Data

May 17, 1991 [JP] Japan ................. 3-044626 U
May 17, 1991 [JP] Japan ................. 3-044627 U

[51] Int. Cl.$^6$ ............................................... H04R 25/00
[52] U.S. Cl. ...................... 381/192; 381/194; 340/311.1
[58] Field of Search ............................. 381/194, 199,
381/192, 205, 152, 200, 188, 195; 340/825.44, 311.1

[56] References Cited

U.S. PATENT DOCUMENTS

| | | | |
|---|---|---|---|
| 3,178,512 | 4/1965 | Ashworth | 381/120 |
| 3,449,531 | 6/1969 | Ashworth | 381/200 |
| 4,151,379 | 4/1979 | Ashworth | 381/195 |
| 4,251,807 | 2/1981 | Hofer et al. | 340/384 R |
| 4,720,868 | 1/1988 | Hirano | 381/195 |
| 5,107,540 | 4/1992 | Mooney et al. | 381/202 |
| 5,172,092 | 12/1992 | Nguyen et al. | 340/825.44 |

FOREIGN PATENT DOCUMENTS

| | | | |
|---|---|---|---|
| 0968234 | 11/1950 | France | 381/195 |
| 0484872 | 10/1929 | Germany | 381/200 |
| 0705100 | 3/1954 | United Kingdom | 381/195 |

*Primary Examiner*—Wing F. Chan
*Assistant Examiner*—Huyen D. Le
*Attorney, Agent, or Firm*—Sixbey, Friedman, Leedom & Ferguson; Gerald J. Ferguson; Evan R. Smith

[57] ABSTRACT

An integrated sound generator/vibrator has a higher frequency responsive sound producing body and a low frequency responsive vibrating body which may be operated simultaneously or separately. In one embodiment, a pole piece is anchored to the center of a spring body, and armatures are fastened to the center of a compliant diaphragm facing the pole piece. Magnets and excitation coils are fastened in a case to surround the pole piece. In another embodiment, a voice coil is fastened to the center of a compliant diaphragm, a magnet is anchored to the center of a spring body, and the diaphragm and spring body are positioned to face each other with the magnet centered in the voice coil. In a variation of the second embodiment, a magnetic unit comprising a pole piece, a ring magnet, and a yoke is attached to the spring body. The magnetic circuit in each design selectively produces a high frequency field which operates the high frequency diaphragm, and/or a low frequency field which moves the pole piece or central magnet on the spring body to cause vibrations.

34 Claims, 2 Drawing Sheets

INTEGRATED VIBRATING AND SOUND PRODUCING DEVICE

This application is a Continuation of Ser. No. 07/881,031, filed May 11, 1992, now abandoned.

BACKGROUND ART

Previously, an electromagnetic sound producing device was configured, as shown in FIG. 1, by anchoring a pole piece 2 to the center of case 1, around which an excitation coil 3 is wound. Magnets 4 are placed in the case 1, and a diaphragm 6, having armatures 5 fastened in the center such that they face the top of the pole piece 2, is also placed in case 1.

However, with this electromagnetic sound producing device, it was possible to obtain only a single-peak reproducing characteristic having a peak at the resonance point of the required frequencies, and it was not possible to use it as a low frequency vibrating device since very little sound pressure could be obtained at low frequencies.

In another prior art design, illustrated in FIG. 2, a sound producing device was configured by anchoring a magnet 7 on the bottom plate of a case 8, connecting voice coils 9 to diaphragm 10, and positioning the voice coils 9 in the magnetic space 11 produced by the magnet 7. This design has been popularized as a speaker having a broadband reproduction characteristic of 20 Hz to 20 KHz.

However, this design also cannot be used as a low frequency vibrating body since the necessary sound pressure is not obtainable at very low frequencies. In addition, devices of this type inherently provide only a single-peak reproducing characteristic having a peak at the resonance point of the required frequencies. Consequently, it was not possible to use this device as a low frequency vibrating body.

In applications such as radio-activated pagers, it is desirable to provide selective announcement of an incoming page by either an audible signal or by a low frequency vibration that will be perceived by the person carrying the pager, but not by other persons in the area. In a modern miniaturized pager, space is at a premium. Therefore, the inventor has found that there is a need for a single, compact low-power device that is capable of selectively producing either an audible signal, a low frequency vibration, or both depending on the signals provided to the device.

SUMMARY OF THE INVENTION

Therefore, it is an object of the present invention to provide an integral device capable of selectively producing either an audible signal, a low frequency vibration, or both depending on the signals provided to the device.

Another object of the present invention is to provide an integrated device capable of resonating at a high frequency and at a very low frequency.

In a preferred embodiment of the present invention, an electromagnetic converter has a magnetic circuit, consisting of a pole piece, armatures, and magnets, which is formed by anchoring a pole piece to the center of a high compliance spring body, fastening armatures to face the pole piece in the center of a low compliance diaphragm, and fastening the magnets and excitation coils in a case so as to surround the pole piece. The diaphragm and the spring body are positioned facing each other and housed in the case such that one end surface of the pole piece corresponds to the middle of the excitation coils. By applying high frequency or low frequency signals to the excitation coils, buzzer sounds at 2–4 KHz and/or vibrations at 50–100 Hz may be selectively produced.

In another preferred embodiment, an electromagnetic induction-type device is provided with voice coils fastened to the center of a low compliance diaphragm. Facing the voice coils, a magnet is anchored to the center of a high compliance spring body. The diaphragm and the spring body are positioned upward and downward to face each other and locate the magnet between the voice coils, and are arranged such that the end surface of one pole of the magnet is at the middle of the voice coils and housed in a case. Like the first embodiment, this embodiment is capable of selectively producing buzzer sounds with a 2–4 KHz high-pass characteristic and/or vibrations with a 50–100 Hz low-pass characteristic. In this embodiment, low frequency or high frequency signals are applied to the voice coils to vibrate the spring body in the polar direction of the magnet.

In a third preferred embodiment, the voice coil is attached to a diaphragm, and a magnetic unit comprising a pole piece, a ring magnet, and a yoke is attached to a spring body. Application of a high frequency to the voice coil causes the diaphragm to vibrate, resulting in a buzzer sound. Application of a low frequency to the voice coil causes the proximate magnetic unit to move on the spring body at low frequency.

BRIEF SUMMARY OF THE DRAWING FIGURES

DETAILED DESCRIPTION OF THE PREFERRED EMBODIMENTS

The present invention relates to the configuration of an electromagnetic sound producing and vibrating device having a high-frequency sounding body and a low-frequency vibrating body.

Figure 1:
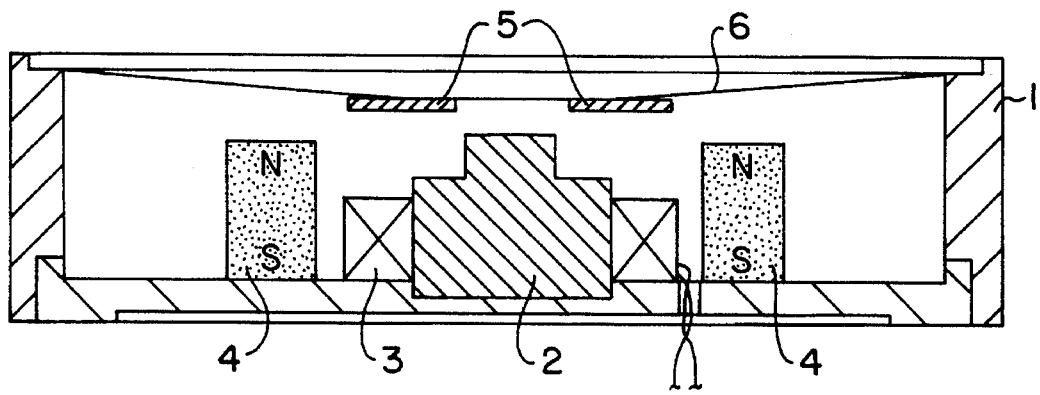
FIG. 1 is a cross-sectional diagram of a prior art electromagnetic sound producing device.
Figure 2:
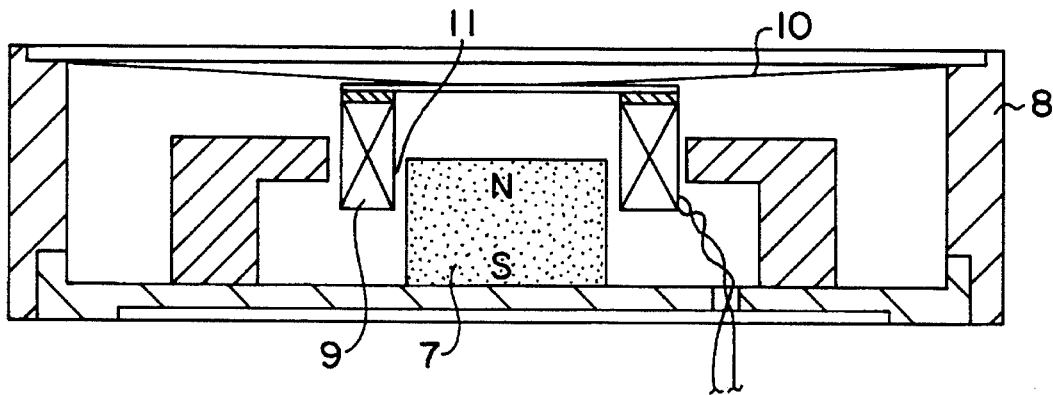
FIG. 2 is a cross-sectional diagram of another prior art electrodynamic sound producing device.
Figure 3:
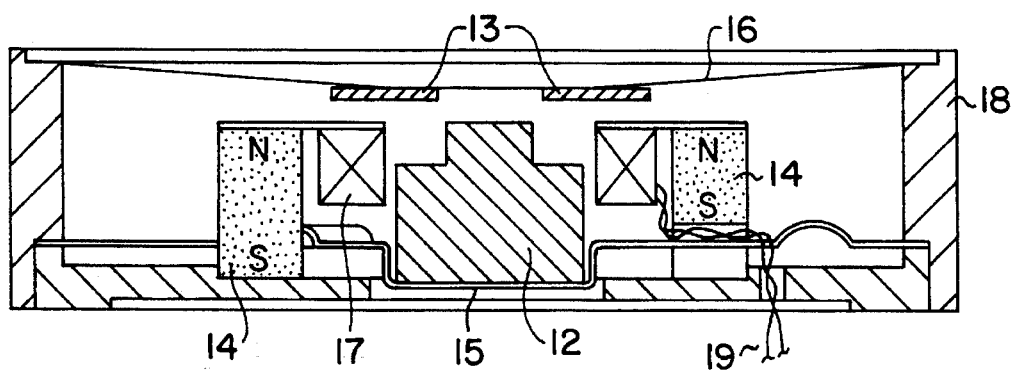
FIG. 3 is a cross-sectional diagram of a first embodiment of the electromagnetic device of the present invention.

FIG. 3 shows a first preferred embodiment of the present invention. A magnetic circuit consisting of a pole piece 12, armatures 13, and magnets 14 is formed by anchoring the pole piece 12 to the center of a high compliance spring body 15, fastening armatures 13 to face the pole piece in the center of a relatively low compliance diaphragm 16, and fastening the magnets 14 and excitation coils 17 in a case 18 so as to surround the pole piece 12. Diaphragm 16 and spring body 15 are positioned facing each other and housed in case 18 such that one end surface of pole piece 12 corresponds to the middle of the excitation coils 17. In this embodiment, the application of 2.1 and 2.7 KHz to the excitation coils 17 through wires 19 causes a buzzer sound, and the application of 50 Hz causes vibrations. The buzzer sound and the vibration frequencies can be changed by suitable modification of the compliance difference between the diaphragm 16 and spring body 15.

This design enables the production of a unitary device which integrally generates a buzzer sound and/or vibrations. The incorporation of the converter into pagers or signal receivers for hearing-impaired people will make it possible to use it in these devices to alert the carrier of the device by signaling to adjacent body parts with vibrations, i.e. by a tactile transmission, instead of a buzzer sound.

Figure 4:
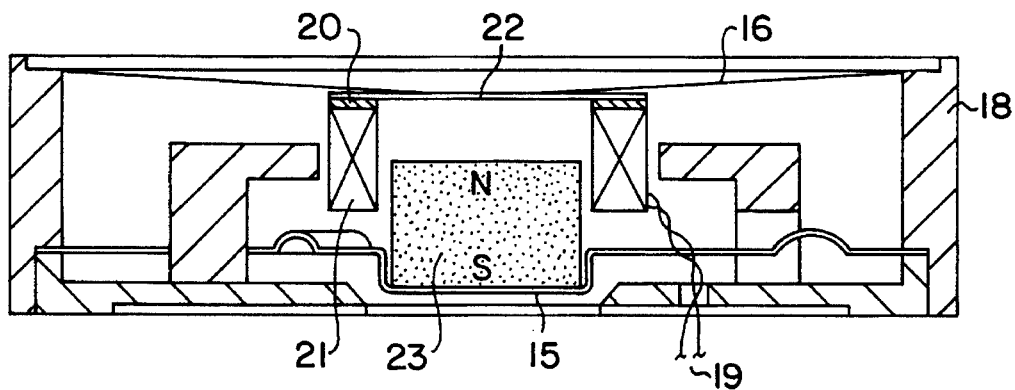
FIG. 4 is a cross-sectional diagram of another preferred embodiment of the present invention which is an electromagnetic induction-type device.

FIG. 4 shows the invention according to a second preferred embodiment. A low compliance diaphragm 16 supports a yoke 20 and a voice coil 21 using a supporter 22. The magnet 23 is anchored to the center of a high compliance spring body 15, and the diaphragm 16 and spring body 15 are placed downward and upward facing each other in the case 18 such that the magnet 23 is set in the center of voice coils 21. Spring body 15 is a means for permitting movement of magnet 23 in response to a field generated by voice coils 21. When the end surface of one pole of magnet 23 is positioned at the middle of the voice coil 21, maximum efficiency is obtained. The application of 2.1 and 2.7 KHz to the voice coil 21 through wires 19 causes a buzzer sound, and the application of 50 Hz causes vibration. The buzzer sound and the vibration frequencies can be changed by setting the compliance difference between the diaphragm 16 and spring body 15 as desired.

This embodiment similarly provides a device which integrally generates a buzzer sound and/or vibrations. The incorporation of the device into pagers or signal receivers for hearing-impaired people will make it possible to use it in these devices to alert the carrier of the device by signaling body parts with vibrations instead of a buzzer sound.

The embodiment of FIG. 4 is an electromagnetic induction-type device.

The resonance frequency of the vibration system, which has magnet 23 placed to move in response to low frequency input signals, preferably either matches the low input frequency or an integer multiple of this frequency, and is capable of discriminately producing buzzer sounds with a 2–4 KHz high-pass characteristic and vibrations with a 50–100 Hz low-pass characteristic by applying either low frequency or high frequency signals to the voice coils to vibrate the spring body 15 in the polar direction of magnet 23.

Figure 5:
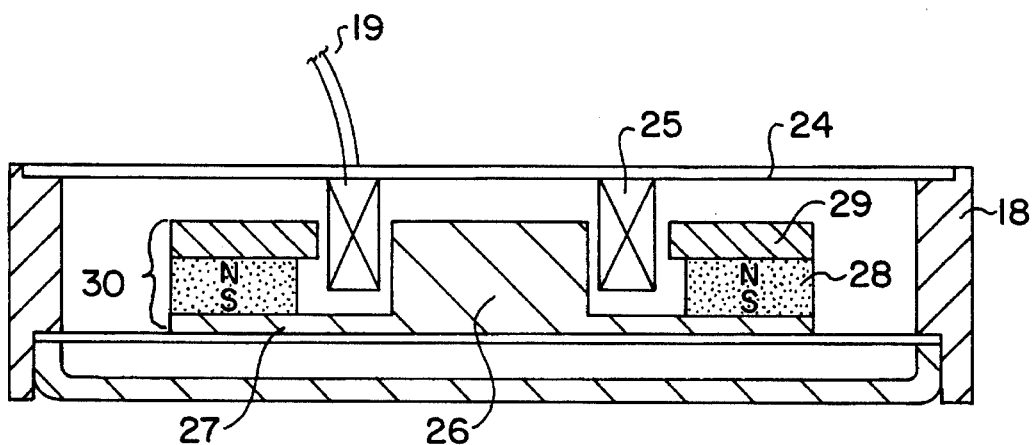
FIG. 5 is a cross-sectional diagram of another preferred embodiment of the present invention.

FIG. 5 shows a third preferred embodiment of the present invention. Referring now to FIG. 5, voice coil 25 is mounted on the center of diaphragm 24 and is connected to a frequency signal source (not shown) by wires 19. Diaphragm 24 is mounted about its periphery to case 18. A unit 30 is mounted on the center of a spring body 27 which is attached at its ends to case 18. Unit 30 comprises pole piece 26, ring magnet 28, and ring-shaped yoke 29, and is positioned so that pole piece 26 is located in the center of voice coil 25. Ring magnet 28 is mounted about the periphery of pole piece 26 and yoke 29 is mounted on ring magnet 28. Spring body 27 has a relatively low compliance, so that it permits low-frequency movement relative to case 18 of the unit 30 comprising pole piece 26, ring magnet 28, and yoke 29.

Spring body 27 is a means for permitting movement of unit 30 in response to a field generated by voice coil 25. The application of 2.1 and 2.7 KHz to voice coil 25 through wires 19 causes a buzzer sound due to induced vibration of diaphragm 24, and the application of 100–200 Hz causes a low frequency vibration due to vibration of unit 30 on spring body 27. The buzzer sound and the vibration frequencies can be changed by setting the compliance difference between the diaphragm 24 and spring body 27 as desired.

We claim:

1. A compact electromagnetic converter device comprising:

field generation means for producing a magnetic field, said field generation means comprising a magnetic circuit including a permanent magnet, a pole piece, and a single coil for receiving predetermined low frequency signals and high frequency signals from a signal source and generating a field output in response to said low frequency signals and high frequency signals;

low frequency responsive means for producing a tactilely transmitted vibration, comprising compliant means mounted in association with said field generation means and a mass rigidly attached to said compliant means, said compliant means having a compliance, such that said mass transmits tactilely perceptible vibrations in response to said magnetic field produced by said predetermined low frequency signals;

high frequency responsive means for producing an audible indication comprising diaphragm means mounted to flex relative to said field generation means, said diaphragm means moving in response to said magnetic field produced by said high frequency signals to produce an audible sound.

2. The device of claim 1 wherein said mass comprises at least one of said permanent magnet and said pole piece.

3. The device of claim 2 wherein said device is mounted in a housing.

4. The device of claim 3 wherein the device operates by electromagnetic induction.

5. The device of claim 3 wherein said diaphragm means comprises a diaphragm mounted peripherally to the housing, and the coil is fastened to a central region of said diaphragm.

6. The device of claim 5 wherein said magnet is anchored to said compliant means and movable therewith with respect to said coil and said pole piece.

7. The device of claim 6 wherein said magnet is located in a center of said coil.

8. The device of claim 7 wherein said diaphragm and said compliant means are aligned with each other across said center of said coil.

9. The device of claim 7 wherein said coil is generally toroidal in shape and said magnet has an end surface, such that said magnet is mounted with said end surface substantially aligned with a plane bisecting said toroidally shaped coil and perpendicularly intersecting an axis of symmetry of said coil which passes through the center of said coil without intersecting said coil.

10. The device of claim 7 wherein said compliant means comprises a spring body which is vibrated in the polar direction of the magnet by applying low frequency signals to said coil.

11. The device of claim 6 wherein said device has a resonance frequency equal to one of a frequency of the predetermined low frequency signals and an integer multiple of said frequency of said predetermined low frequency signals.

12. The device of claim 5 wherein said mass attached to said compliant means comprises a magnetic circuit unit.

13. The device of claim 12 wherein said magnetic circuit unit comprises said pole piece and said magnet of said field generation means.

14. The device of claim 13 wherein said magnetic circuit unit further comprises a yoke.

15. The device of claim 14 wherein said magnet is a ring-shaped magnet mounted between said pole piece and said yoke.

16. The device of claim 3 wherein said device has a resonance frequency equal to one of a frequency of the predetermined low frequency signals and an integer multiple of said frequency of said predetermined low frequency signals.

17. The device of claim 1 wherein said device has a resonance frequency equal to one of a frequency of the predetermined low frequency signals and an integer multiple of said frequency of said predetermined low frequency signals.

18. The device of claim 1 wherein the field generation means, low frequency responsive means, and high frequency responsive means are mounted in a compact structure and installed in a pager.

19. The device of claim 1 wherein the low frequency signals are in a range from about 50 to about 100 Hz and the high frequency signals are in a range from about 2000 Hz to about 4000 Hz.

20. The device of claim 1, wherein said compact converter device is installed in a portable pager and comprises means connected to the field generation means for receiving said low frequency and said high frequency signals so that said field generation means selectively generates at least one of said vibrations and said audible sounds for alerting a user of the pager.

21. A compact electromagnetic converter device comprising:

field generation means for producing a magnetic field, said field generation means comprising a magnetic circuit including a permanent magnet, a pole piece, and a single coil for receiving predetermined low frequency signals and high frequency signals from a signal source and generating a field output in response to said low frequency signals and high frequency signals;

low frequency responsive means for producing a tactilely transmitted vibration, comprising compliant means mounted in association with said field generation means and a mass rigidly attached to said compliant means, such that said mass transmits tactilely perceptible vibrations in response to said magnetic field produced by said predetermined low frequency signals;

high frequency responsive means for producing an audible indication comprising diaphragm means mounted in association with said field generation means, said diaphragm means moving in response to said magnetic field produced by said high frequency signals to produce an audible sound;

wherein said mass includes said pole piece and said pole piece is anchored to said compliant means and movable therewith with respect to said coil.

22. The device of claim 21 wherein the diaphragm means comprises a diaphragm mounted peripherally to the housing with armatures fastened to a central region of said diaphragm proximate to said pole piece.

23. The device of claim 21 wherein said pole piece is located centrally with respect to said single coil.

24. The device of claim 23 wherein said diaphragm and said compliant means and aligned with each other across said center of said single coil.

25. The device of claim 23 wherein said coil is generally toroidal in shape and said pole piece has an end surface, such that said pole piece is mounted with said end surface substantially aligned with a plane bisecting said toroidally shaped coil and perpendicularly intersecting an axis of symmetry of said coil which passes through the center of said coil without intersecting said coil.

26. A compact converter device selectively capable of providing both an audible indication signal and a vibration signal suitable for substantially silent transmission to a human body, comprising: a single magnetic circuit arrangement for generating magnetic fields, including a permanent magnet, a pole piece, and a single coil connectable to a source of predetermined low frequency signals and higher frequency signals for selectively providing said magnetic field; and a plurality of compliant means having different compliances, with at least one compliant means producing a vibration signal in response to said magnetic field generated by said magnetic circuit arrangement when said predetermined low frequency signals are applied to said single coil, and another compliant means producing an audible sound in response to said magnetic field generated by said magnetic circuit arrangement when said higher frequency signals are applied to said single coil.

27. The device of claim 26 wherein the low frequency signals are in a range from about 50 to about 100 Hz and the high frequency signals are in a range from about 2000 Hz to about 4000 Hz.

28. A compact, dual mode signaling device for a portable pager, comprising:

a single field generation means comprising a magnetic circuit including a permanent magnet, a pole piece, and a single coil, for receiving predetermined low frequency signals and high frequency signals specifying one of first and second operating modes of the device, and for producing a localized magnetic field in response to said signals;

quiet signalling means for producing a tactilely transmitted vibration in at least said first operating mode, said quiet signalling means including a spring member with a mass rigidly attached thereto so that the mass is vibrated by said magnetic field of said field generation means when said low frequency signals are received; and audible signalling means for producing an audible indication in said second operating mode, said audible signalling means having a diaphragm mounted to flex with respect to the field generation means and having a different compliance from the spring member, said mass moving separately from said spring member in response to said magnetic field of said field generation means when said high frequency signals are received.

29. The signalling device of claim 28 wherein said low frequency signals are in a range from 50 to 200 Hz and said high frequency signals in a range from 2 to 4 Khz.

30. A compact, dual mode signalling device for a portable pager, comprising:

a single field generation means including a magnetic circuit, said magnetic circuit including a permanent magnet, a pole piece, and a single coil for receiving low frequency signals in a predetermined frequency range and high frequency signals with a predetermined frequency range higher than said range of said low frequency signals, said high frequency signals and low frequency signals specifying one of first and second operating modes of the device, and for producing a localized magnetic field in response to said signals;

quiet signalling means mounted proximate to said field generation means and having a mass comprising a portion of said magnetic circuit mounted on a spring member for producing a tactilely transmitted vibration for silent mode pager message signalling within said predetermined low frequency range in at least said first operating mode, said mass vibrated by said magnetic field of said field generation means when said low frequency signals are received;

audible signaling means mounted proximate to said field generation means for producing an audible buzzer indication for audible mode pager signalling including a tone within said predetermined high frequency range in said second operating mode, said audible signalling means comprising a speaker diaphragm moving separately from said mass and said spring member and directly actuated by said magnetic field of said field generation means when said high frequency signals are received;

a case for mounting said field generation means, said quiet signalling means, and said audible signalling means; and means for operably installing said case in a pager assembly to receive and be activated by said low frequency signals and said high frequency signals.

31. The device of claim 30 wherein the low frequency signals are in a range from 50 to 200 Hz and the high frequency signals are in a range from 2000 Hz to 4000 Hz.

32. The signalling device of claim 30 wherein the magnetic pole piece is rigidly mounted to the spring member and said single coil surrounding the pole piece and rigidly mounted with respect to said case, with said diaphragm mounted to said case at a periphery thereof, further comprising armatures attached in a central area of said diaphragm proximate said single coil, the single coil moving said armatures and said diaphragm when said high frequency signals are received.

33. The signalling device of claim 30 wherein said single coil is attached to said speaker diaphragm to move therewith, the pole piece mounted rigidly with respect to said case and the permanent magnet rigidly mounted to the spring member so that the permanent magnet moves when said low frequency signals are received by said single coil and the diaphragm moves with respect to the case and spring member when said high frequency signals are received by said single coil.

34. The signalling device of claim 30 wherein said voice coil is attached to said speaker diaphragm to move therewith, the permanent magnet having a ring shape, and a ring shaped yoke; the pole piece, magnet, and yoke rigidly mounted to the spring member so that the pole piece, magnet, and yoke move when said low frequency signals are received by said single coil and the diaphragm moves with respect to the spring member when said high frequency signals are received by said single coil.

\* \* \* \* \*